United States Patent Office 3,101,679
Patented Aug. 27, 1963

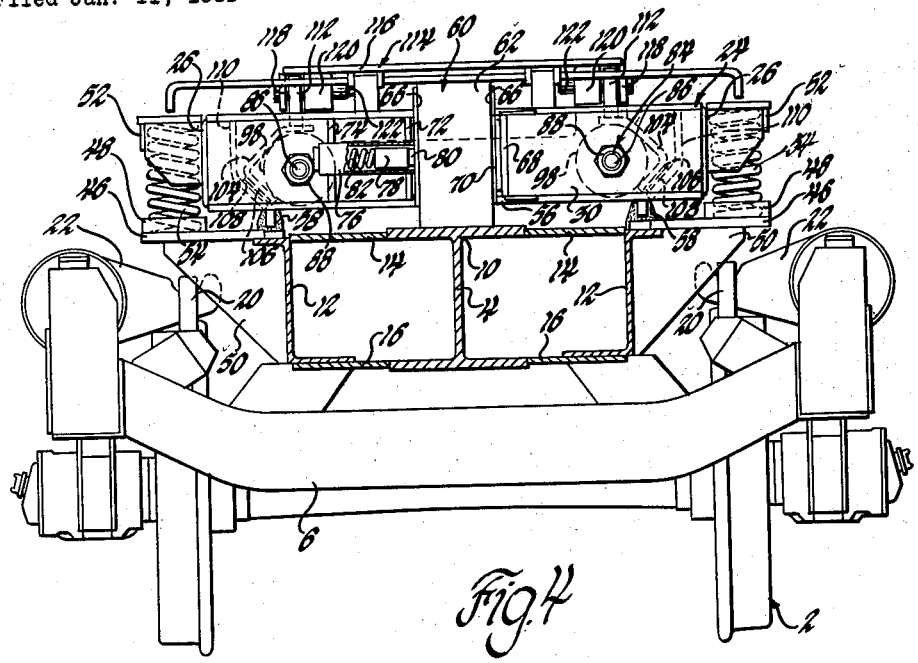

3,101,679
RAILWAY VEHICLE SUSPENSION AND
SHOCK ABSORBING MEANS
Michael J. Principe and James C. Richardson, London, Ontario, Canada, assignors to General Motors Corporation, Detroit, Mich., a corporation of Delaware
Filed Jan. 11, 1961, Ser. No. 82,059
8 Claims. (Cl. 105—368)

This invention relates generally to railway vehicles and particularly to special suspension means mounted on said vehicles which are adapted to supplement the primary suspensions thereof and cushion against shock loads applied to said vehicle.

An important object of the invention is to provide a sprung portion on one end of a railway vehicle which in turn has mounted thereon a horizontal arresting gear adapted to cushion the load against horizontal shock loads applied to the railway vehicle.

It is a further object of this invention to provide in a railway vehicle which includes an underframe, a secondary suspension which is pivotally supported at one end on the underframe and has spring means interposed between the frame and underframe to cushion any load to be carried by said secondary suspension.

Another object of the invention is to provide a secondary suspension which includes a frame pivotally connected to the underframe of the vehicle and to resiliently support said frame on the railway vehicle underframe and to further provide guide means to stabilize the movement of the frame relative to the underframe.

For the above and further objects of this invention, reference may be made to the accompanying detailed description and drawings, in which:

FIGURE 1 is a side view in elevation of a railway vehicle with the novel supplementary suspension superimposed thereon at the left end of the vehicle when viewing FIGURE 1. FIGURE 1 also shows a highway semi-trailer on said railway vehicle with its rear bogie removed and with its kingpin received and anchored in the kingpin receiving means mounted on the supplementary suspension which supports the kingpin end of the semi-trailer.

FIGURE 4 is a view in elevation looking toward the forward end of the railway vehicle with parts broken away and in section taken substantially on the line 4—4 of FIGURE 2 also illustrating further details of the secondary suspension and the manner in which its movement is damped relative to the underframe of the railway vehicle.

FIGURE 5 is a side view in elevation taken substantially on the line 5—5 of FIGURE 2 with parts broken away and in section illustrating in particular certain details of the horizontal shock absorbing means which tends to cushion the end of the semi-trailer carried by the car against horizontal or buff loads applied thereto.

Figure 1:
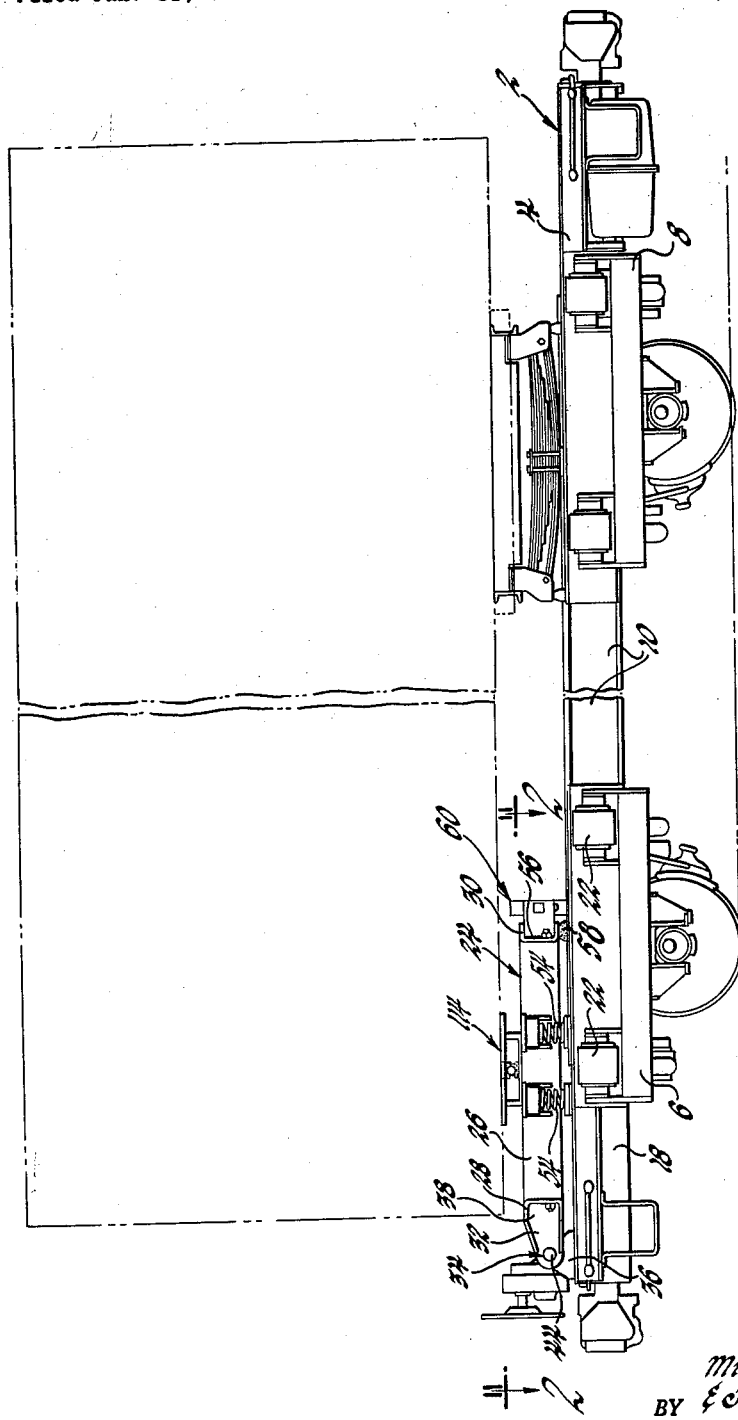

Referring now to the drawings and particularly FIGURE 1, the railway vehicle which is indicated generally by the numeral 2 includes an underframe 4 supported at opposite ends by truck assemblies 6 and 8. The underframe 4 is a welded fabrication and includes a center sill 10 having built-up ends formed by the oppositely disposed Z members 12 and upper and lower plates 14 and 16, respectively (see FIGURE 4). A numeral 18 has been chosen to denote the end of the underframe with which the present invention is concerned.

As particularly shown in FIGURE 4, the end 18 of underframe 4 is supported by hangers 20 hung from torsion arm structures 22 mounted at the four corners of truck assembly 6. The primary suspension of the railway vehicle end 18 constitutes the truck assembly 6 and the manner in which it resiliently supports end 18. This primary suspension per se does not form the subject of this invention and, consequently, no further description is deemed necessary with respect thereto.

Figure 2:
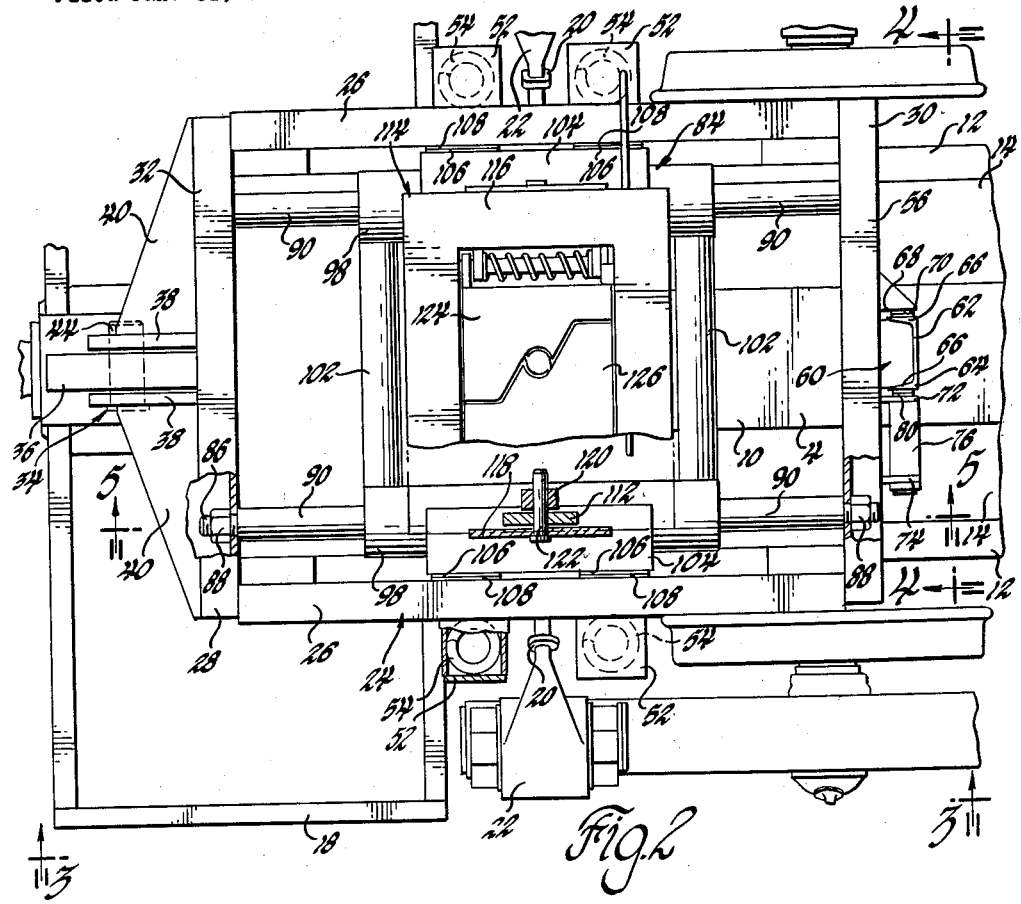
FIGURE 2 is a view in plan with certain parts broken away and in section taken substantially on the line 2—2 of FIGURE 1 further illustrating the novel secondary suspension and the details thereof.
Figure 3:
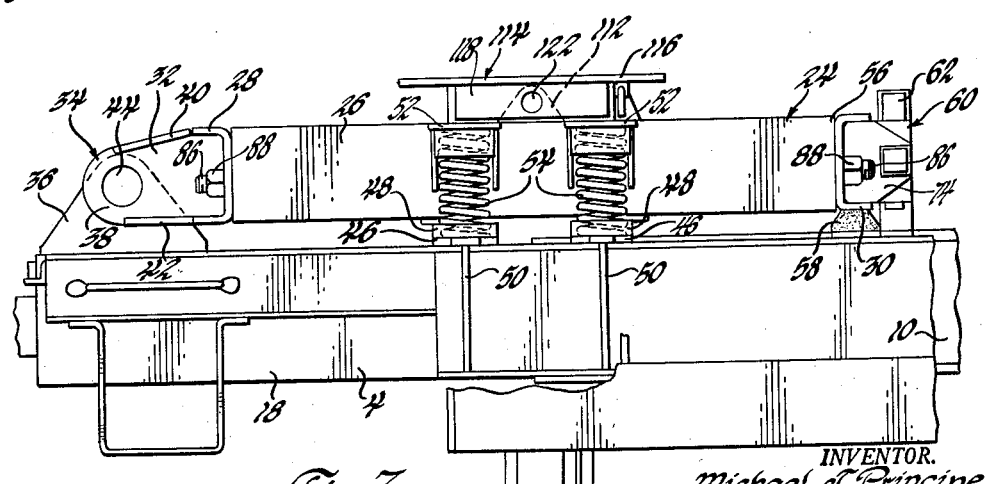
FIGURE 3 is a view taken substantially on the line 3—3 of FIGURE 2 with parts broken away particularly illustrating the manner in which the supplementary suspension is pivotally connected to the underframe and supported thereon by means of springs.

Referring now particularly to FIGURES 2, 3 and 4, it will be observed that located above the end 18 of underframe 4 is a supplementary frame indicated generally by a numeral 24. Frame 24 is more or less rectangular in shape and includes a pair of oppositely disposed longitudinally extending inwardly facing channels 26 and a pair of longitudinally spaced transversely extending end facing channels 28 and 30 whose ends are welded or otherwise secured to the ends of channels 26. It will be noted especially from FIGURES 2 and 3 that the forward end 32 of frame 24 is pivotally connected to the front end of the end 18 of underframe 4. This pivotal connection indicated generally by a numeral 34 includes an upstanding plate 36 of relatively great thickness which is welded or otherwise secured to the upper side of the underframe end 18. Disposed on opposite sides of plate 36 and welded to channel 28 are plates 38. The plates 38 are additionally secured to channel 28 by upper and lower reinforcing web or fillet plates 40 and 42, respectively.

Extending through holes provided in the ends of plates 38 and plate 36 is a pin 44 which provides the pivot axis for movement of frame 24 in a vertical plane relative to the underframe end 18. Intermediate the ends of frame 24 and extending outward of the Z members 12 and secured to the upper feet thereof are horizontal plates 46 which have formed on the upper side thereof lower spring seats 48. These plates 46 and seats 48 are reinforced in the position shown by vertical outwardly extending web plates 50 welded to the undersides of plates 46 to the webs and feet of Z members 12.

It will be noted that there are actually four spring seats 48 located as just described and that there is a spring seat on either side of both the longitudinal and transverse center lines of the frame 24. Located immediately above each of the spring seats 48 is a downwardly facing spring seat 52. Each spring seat 52 is secured to the web of an associated channel 26 outboard thereof. Interposed between associated lower and upper spring seats 48 and 52, respectively, are helical coil springs 54 whose lower and upper ends are anchored in the aforementioned seats.

Referring now to the trailing end of the frame 24 which is identified by a numeral 56, it will be observed that end 56 is to some extent supported on a pair of transversely disposed snubbers 58 of some suitable resilient material. The primary purpose of the snubbers 58 is to prevent the end 56 from contacting the upper side of the underframe end 18 when the car is subjected to vertical or other impact forces, etc.

In order to more fully stabilize the frame 24 as it is supported by the springs 54 and restrained to some extent horizontally by the pivotal connection 34, special guide means have been provided at the end 56, and these guide means are indicated generally by a numeral 60. The guide means 60 includes an upstanding projection 62 formed by a channel 64 welded or otherwise secured to the upper side of underframe end 18. The feet of channel 64 are provided with laterally outwardly facing chafing plates 66.

On one side of the upstanding projection 62 secured to the rear transversely extending member 30 is a rearwardly extending vertical plate 68 which has fixed thereto a laterally inwardly facing chafing plate 70 associated with and adapted to engage one of the chafing plates 66. On the opposite side of the upstanding projection 62 there is mounted by means of plates 72 and 74 a transversely extending cylindrical housing 76. Located within the housing 76 is a plunger 78 which has secured to one end thereof a chafing plate 80 adapted to engage the other chafing plate 66. The plunger 78 is biased toward chafing plate 66 by a spring 82 so as to cause chafing engagement between plates 66 and 70 and 80, respectively. It may be thus appreciated that in addition to guiding the frame 24 for movement in a vertical plane about the pivot 34, such movement is frictionally damped by the chafing plates and loaded plunger 78.

As previously emphasized, this invention in addition to providing means for supplementing the primary suspension of the end 18 of railway vehicle 2, also includes means adapted to cushion any load carried thereby against horizontal shock loads applied to the railway vehicle. This latter means has been indicated generally by a numeral 84. This means 84, which will also be referred to as the horizontal arresting gear, will best be understood by observing FIGURES 2, 4 and 5. It will be noted that extending longitudinally between the longitudinally spaced transverse channels 28 and 30 are a pair of transversely disposed studs 86. The studs 86 are secured in place by nuts 88 on the threaded ends thereof. Mounted on the studs 86 adjacent the opposite ends thereof and abutting the channels 28 and 30 are four sleeves 90. These sleeves each have fixed to one end thereof a washer 92 which along with its associated sleeve is adapted to slide back and forth along the stud 86.

Interposed between sets of washers 92 are alternate metal and rubber disks 94 and 96, respectively. Surrounding both the oppositely disposed sets of washers 92 as well as the disks 94 and 96 are a pair of longitudinally extending tubular members 98 forming a part of the arrester gear frame as will appear shortly. These tubular members 98 have welded inside the opposite ends thereof washers 100 which are adapted to move back and forth with their associated tubular member 98 along the outside of the associated sleeve 90. It will be noted that each washer 100 and an associated washer 92 abut each other when the arresting gear is in its normal centrally located position. These washers, however, separate under certain conditions of horizontal shock load as will appear shortly in the description of the operation of the arrester gear.

The oppositely disposed tubular members 98 are connected together by a pair of longitudinally spaced transverse tubular members 102 which, along with the members 98, make up the movable frame of the arrester gear. The operation of this arrester gear is as follows: Assuming the load, in this case the kingpin end of the semi-trailer, is suitably secured to the frame of the arrester gear 84 and a horizontal shock load is applied to the car in a longitudinal direction, there will be a tendency for the frame to move either forward or backward. Assuming that it moves backwardly, it will be observed that the washers 100 will carry the washers 92 and sleeve 90 along the studs 86 to the right as viewed in FIGURE 5. This will, of course, compress the rubber disks 96 against the washers 92 at the opposite ends which are restrained in moving along the studs 86 because of the abutment of sleeves 90 against the channel 30. A similar action will occur if the horizontal buff load is applied from the opposite direction.

In order to damp this horizontal movement of the arrester gear 84, there are provided on each of the tubular members 98 channel-like plates 104 which have downwardly outwardly facing chafing plates 106 provided thereon which engage associated chafing plates 108 supported on plates 110 secured to the insides of the channels 26. These plate assemblies 104 and 110 also serve to support the frame of arrester gear 84 so that the load need not be carried by the studs 86. This is accomplished by welding the upper horizontal portions of plates 104 to the upper sides of tubular members 98. Since the lower portions of plates 104 are slidingly supported on plates 110 the arrester gear 84 of which tubular members 98 are a part is also supported by plates 104.

Mounted on the upper side of the tubular members 98 immediately above the plates 104 are upwardly projecting plates 112 which form pedestal pivotal supports for a fifth wheel hitch indicated generally by a numeral 114. The fifth wheel hitch 114 includes a frame 116 having downwardly extending plates 118 and members 120 formed as a part thereof through which pins 122 extend to thereby pivotally support the fifth wheel hitch 114 on the pedestals 112 about a transverse axis. The fifth wheel hitch 114 includes a pair of jaws 124 and 126 between which the semi-trailer kingpin is adapted to be received and anchored. Thus, the kingpin end of the semi-trailer is secured and supported by the fifth wheel hitch. Since the details of this hitch do not form any part of this invention, no further description is deemed necessary with respect thereto.

From the foregoing description it may now be appreciated that a very unique supplementary suspension system has been provided for a railway vehicle particularly adapted to receive and cushion both against vertical and horizontal shock loads the kingpin end of a highway semi-trailer. The novel secondary suspension is also readily usable with other types of loads.

We claim:
1. In a railway vehicle including an underframe, a secondary suspension thereon for supporting the kingpin end of a highway semi-trailer comprising a frame horizontally disposed above said underframe, a pivotal connection between said frame and underframe supporting one end of said frame on said underframe for movement of said frame about an axis extending transversely of said underframe, spring means mounted on said underframe horizontally and longitudinally spaced from said pivotal connection resiliently supporting said frame on said underframe, and means on said frame adapted to receive the kingpin of a highway semi-trailer and resiliently support the kingpin end thereof.

2. In a railway vehicle including an underframe, a secondary suspension thereon for supporting one end of a highway semi-trailer comprising a frame horizontally disposed above said underframe, a pivotal connection between said frame and underframe supporting one end of said frame on said underframe for movement of said frame about an axis extending transversely of said underframe, spring means mounted on said underframe horizontally and longitudinally spaced from said pivotal connection resiliently supporting said frame on said underframe, guide means on the opposite end of said frame cooperating with guide means on said underframe to laterally stabilize said frame relative to said underframe and confine movement thereof to a vertical plane normal to said axis, and means on said frame adapted to receive the kingpin of a semi-trailer and resiliently support the kingpin end thereof.

3. In a railway vehicle including an underframe, a secondary suspension thereon for supporting one end of a highway semi-trailer comprising a frame horizontally disposed above said underframe, a pivotal connection between said frame and said underframe supporting one end of said frame on said underframe for movement of said frame about an axis extending transversely of said underframe, load receiving means on said frame adapted to receive the kingpin of a semi-trailer, transversely disposed longitudinally spaced spring sets mounted on said underframe under opposite sides of said load receiving means resiliently supporting said frame on said underframe so that substantially all of the load on said load receiving means is carried by said springs, and guide means on the opposite end of said frame cooperating with guide means on said underframe to laterally stabilize said frame relative to said underframe and confine movement thereof to a vertical plane normal to said axis.

4. In a railway vehicle including an underframe, a secondary suspension thereon for supporting the kingpin end of a highway semi-trailer comprising a frame horizontally disposed above said underframe, a pivotal connection between said frame and said underframe supporting one end of said frame on said underframe for movement of said frame about an axis extending transversely of said frame, spring means mounted on said underframe horizontally and longitudinally spaced from said pivotal connection resiliently supporting said frame on said underframe, an upstanding projection on said underframe, a pair of embracing pieces on the opposite end of said frame juxtaposed on opposite sides of said projection to thereby guide said frame in a vertical plane as said frame moves relative to said underframe, and load receiving means on said frame adapted to receive the kingpin of a semi-trailer and thereby resiliently support the kingpin end thereon.

5. In a railway vehicle including an underframe, a secondary suspension thereon for supporting one end of a highway semi-trailer comprising a frame horizontally disposed above said underframe, a pivotal connection between said frame and underframe supporting one end of said frame on said underframe for pivotal movement of said frame about an axis extending transversely of said frame, spring means mounted on said underframe horizontally and longitudinally spaced from said pivotal connection resiliently supporting said frame on said underframe, guide means on the opposite end of said frame cooperating with guide means on said underframe to laterally stabilize said frame relative to said underframe and confine movement thereof to a vertical plane normal to said axis, means to damp movement of said frame relative to said underframe in said vertical plane, and means on said frame adapted to receive the kingpin of a highway semi-trailer to resiliently support the kingpin end thereof thereon.

6. In a railway vehicle including an underframe, a secondary suspension thereon for supporting one end of a highway semi-trailer comprising a frame horizontally disposed above said underframe, a pivotal connection between said frame and said underframe supporting one end of said frame on said underframe for pivotal movement of said underframe about an axis extending transversely of said frame, spring means mounted on said underframe horizontally and longitudinally spaced from said pivotal connection resiliently supporting said frame on said underframe, an upstanding projection on said underframe, having laterally outwardly facing chafing plates, laterally inwardly facing chafing plates on said frame engaging said first-mentioned chafing plates, and means resiliently loading one of said chafing plates to thereby frictionally damp cushioned movement of said frame relative to said underframe.

7. In a railway vehicle including an underframe, a secondary suspension thereon comprising a frame horizontally disposed above said underframe, a pivotal connection between said frame and underframe pivotally supporting one end of said frame on said underframe for pivotal movement of said frame about an axis extending transversely of said frame, spring means interposed between said frame and underframe longitudinally and transversely spaced from said pivotal connection resiliently supporting said frame on said underframe, horizontal shock absorbing means supported on said frame, and kingpin anchoring means supported on said shock absorbing means whereby a kingpin end of a semi-trailer with its kingpin anchored in said kingpin anchoring means has its kingpin end cushioned against vertical and horizontal shock loads applied to said vehicle.

8. The combination claimed in claim 7 wherein said horizontal shock absorbing means comprises a pair of transversely disposed longitudinally extending studs secured to said frame and having longitudinally spaced oppositely disposed stops adjacent the ends thereof, a pair of longitudinally extending tubular members mounted around said studs and stops adapted to move back and forth along said studs, a resilient assembly mounted about each shaft, and stops at the opposite ends of each tubular member adapted to engage opposite ends of said resilient assembly whereby movement of said tubular members in either direction tends to compress said resilient members between the stops on said studs and the stops of said tubular members.

References Cited in the file of this patent

UNITED STATES PATENTS

| | | |
|---|---|---|
| 2,305,444 | Pond | Dec. 15, 1942 |
| 2,914,003 | Seel et al. | Nov. 24, 1959 |

FOREIGN PATENTS

| | | |
|---|---|---|
| 209,938 | Austria | July 11, 1960 |